Oct. 1, 1940.   M. A. SISK   2,216,460
PIPE FITTING
Filed July 30, 1938   3 Sheets-Sheet 2
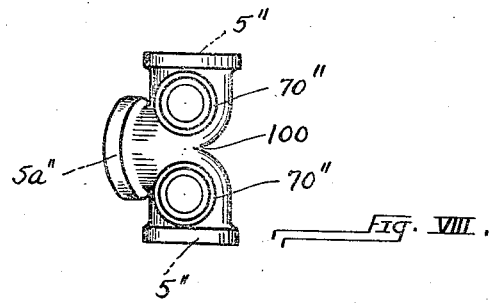
Fig. VIII.
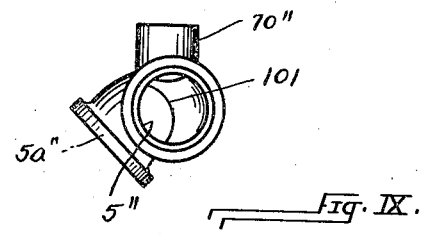
Fig. IX.
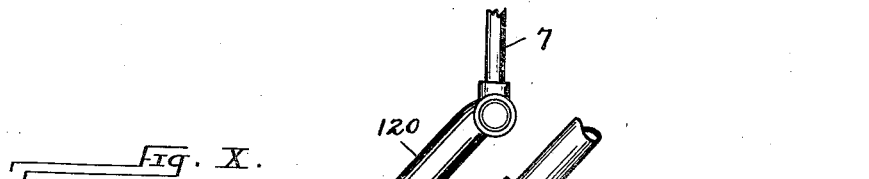
Fig. X.
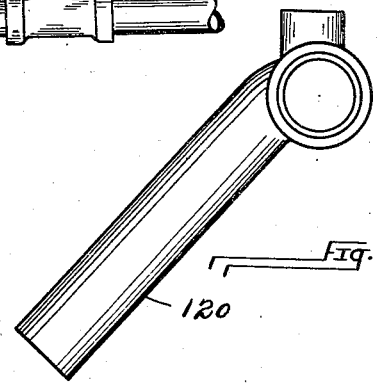
Fig. XII.
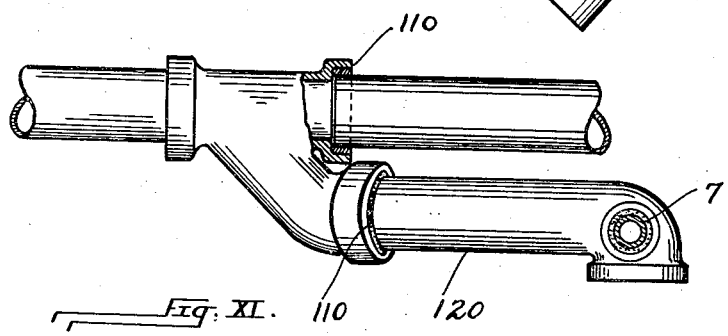
Fig. XI.
INVENTOR
Martin A. Sisk
by Christy and Wharton
Attorneys Oct. 1, 1940.   M. A. SISK   2,216,460
PIPE FITTING
Filed July 30, 1938   3 Sheets-Sheet 3
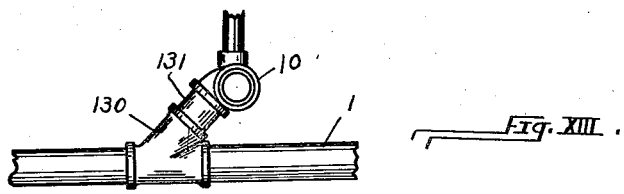
Fig. XIII.
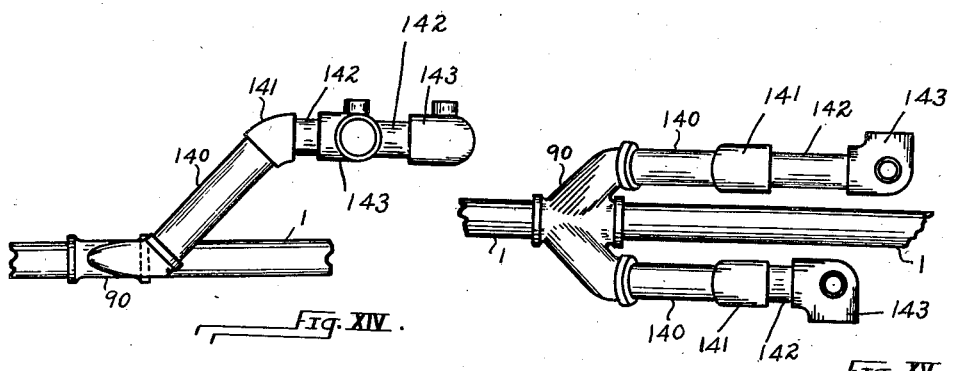
Fig. XIV.   Fig. XV.
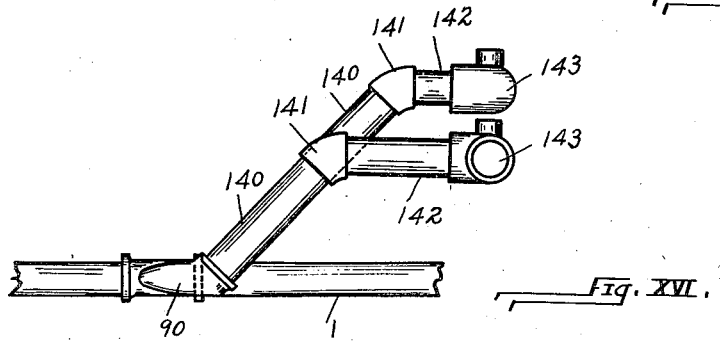
Fig. XVI.
Fig. XVII.
INVENTOR
Martin A. Sisk
by Christy and Wharton
attorneys Patented Oct. 1, 1940

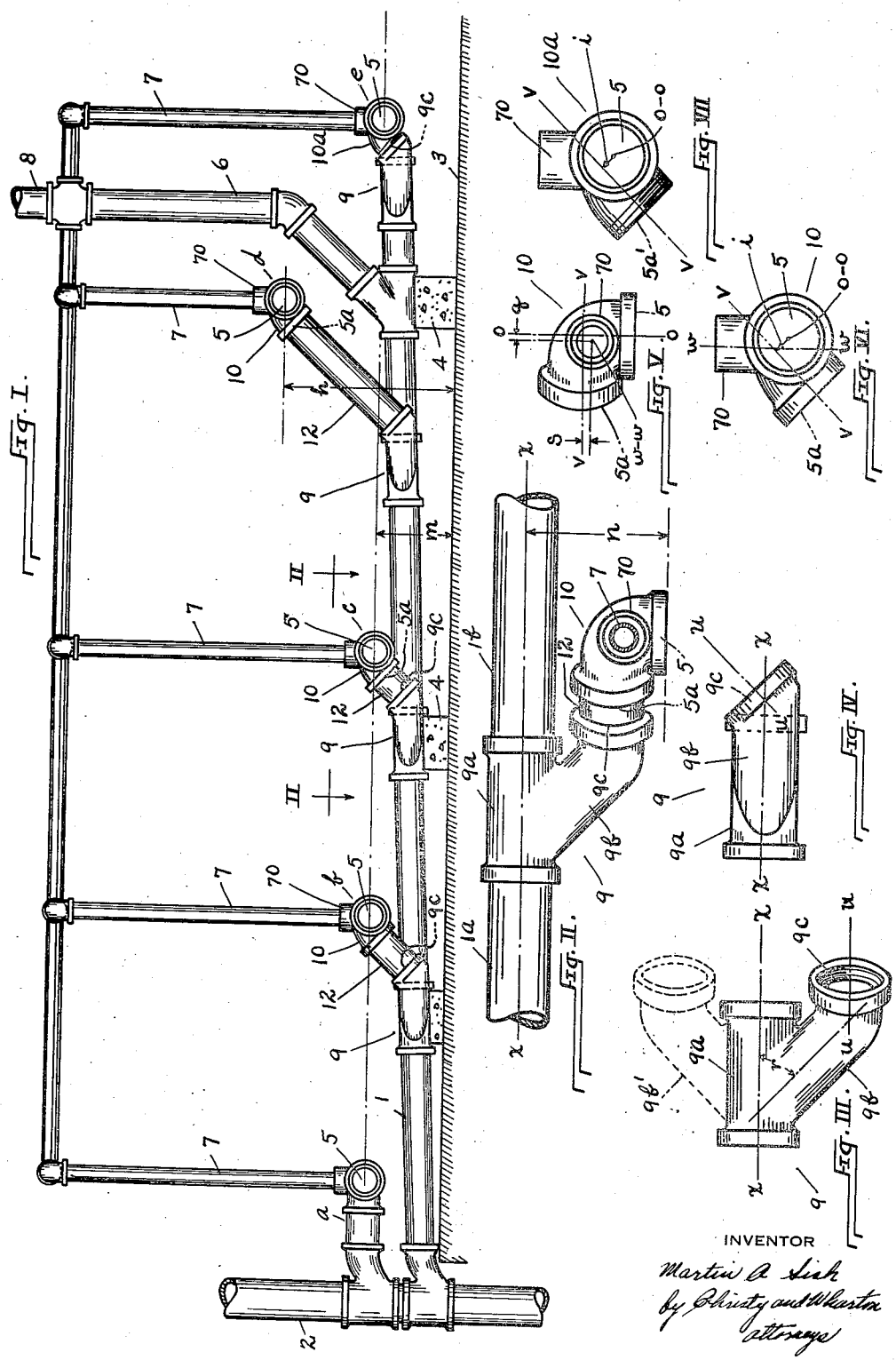

2,216,460

UNITED STATES PATENT OFFICE 2,216,460

PIPE FITTING

Martin A. Sisk, Pittsburgh, Pa.

Application July 30, 1938, Serial No. 222,205

2 Claims. (Cl. 4—211)

My invention relates to plumbing installations, and more particularly to a vented system of waste-pipes for a battery of water closets, urinals, lavatories, or other plumbing fixtures. The invention consists in refinements in the construction and organization of pipes and pipe-fittings in such a system.

The plumbing system of the invention is designed to provide drainage for water closets, or other plumbing fixtures, and is particularly adapted for installations in which the fixtures are mounted on a vertical wall, with the outlet openings of the fixtures in the plane of, or in a plane parallel to, the wall. An example of how such fixtures may be mounted will be found in my copending application for patent, Serial No. 212,482, filed June 8, 1938.

In installing a battery of such fixtures, it is customary to employ a single waste-pipe, and to connect the outlets of the several fixtures to such pipe. Manifestly, the waste-pipe must be inclined at a substantially angle to the horizontal, in order to obtain an adequate drainage gradient, and, due to this essential inclination of the waste-pipe, the number of fixtures which may be assembled with the pipe is limited, it being understood that the fixtures are necessarily spaced apart longitudinally of the waste-pipe and that the pipe at its higher end must not extend above, and preferably should lie below, the center of the outlet of the last fixture in the battery or line of fixtures connected thereto. In seeking to obtain a great number of fixtures properly spaced in a single battery, with the waste-pipe lying at optimum drainage angle, a great many problems have been encountered, and the problems are particularly difficult in the cases in which the outlets of the fixtures are located relatively close to the finish floor-line. In order to gain the desired ends it has been common practice to bury the waste-pipe, at least for a portion of its length, beneath the sub-floor level, but this practice is objectionable, since the pipe is not readily accessible for inspection and repair. Another expedient has been to construct pipe chases or trenches in the sub-floor, but in this practice, as in the practice first mentioned, the construction costs are very high.

The vertical intervals between the waste-pipe and the outlet openings of the successive fixtures in the battery vary, and the outlet branches between the fixtures and the waste-pipe correspondingly vary in length. Many specialized fittings have been developed for making the desired connections between the waste-pipe and the several fixtures of the battery, but in most cases, if not all, each of the fittings require special operations, to adapt it for each particular outlet branch.

In accordance with my invention I provide fittings which, though of specialized construction, consist in standard pipe fittings that have been modified in structural detail. In the use of such fittings only the ordinary operations of the pipe-fitter are necessary in making installation. All variations in the dimensions of the various outlet branches between fixtures and waste-pipe are readily accommodated by the use of simple pipe nipples of properly varied lengths. By virtue of my invention, it is possible in each installation to employ the most effective "fall" or gradient for the waste-pipe. The difficulties arising from inaccuracy in special tool operations are avoided; the mouths of the outlet branches may be properly and readily aligned with the outlets of the fixtures; all pipes may be installed above the sub-floor; the assembly permits the installation of a maximum number of properly spaced fixtures for a waste-pipe of given length and gradient, and, alternately, permits the use of a greater drainage gradient in the installation of a given number of fixtures; all drainage passages are unconstricted; and if desired all pipe joints may be threaded joints, providing greater rigidity and strength than is found in systems embodying caulked joints. These and other advantages attend the practice of this invention.

In the accompanying drawings

Fig. I is a view in front elevation of an installation embodying the invention;

Fig. II is a fragmentary view, showing a part of the piping of the installation to larger scale, on the plane of section II—II of Fig. I;

Fig. III is a view in plan of one of the specialized pipe-fittings that forms an important element of the assembly of the invention;

Fig. IV is a view in front elevation of the pipe-fitting shown in Fig. III;

Fig. V is a view in plan from above of one of the specialized elbows employed in the assembly;

Fig. VI is a view in front elevation of such elbow;

Fig. VII is a view comparable with Fig. VI, illustrating a modification in the structure of the elbow;

Fig. VIII is a view in plan of an elaborated form of the elbow;

Fig. IX is a view in front elevation of the elaborated elbow;

Fig. X is a fragmentary view, showing a portion of the installation of Fig. I, with certain modifications in detail;

Fig. XI is a view in plan and to larger scale of the modfied installation of Fig. X;

Fig. XII is a view in front elevation of the modified elbow used in the installation of Figs. X and XI.

Fig. XIII is a view in front elevation, showing the use of my specialized elbow with a standard Y fitting in the waste-pipe;

Fig. XIV is a view in front elevation, showing an elaborated form of H-Y fitting and illustrating its use in connecting two fixtures that have their outlets arranged in horizontally spaced relation;

Fig. XV is a view in plan of the assembly shown in Fig. XIV;

Fig. XVI is a view comparable with Fig. XIV, illustrating the connections for two fixtures whose outlets are vertically spaced apart;

And Fig. XVII is a similar view illustrating the connections for two fixtures whose outlets are spaced apart both vertically and horizontally.

Referring to the drawings the waste-pipe of the exemplary embodiment of the invention is denoted by the reference numeral 1, and the outlet branches that connect the battery of fixtures (not shown) to the waste-pipe are indicated by the characters a, b, c, d, and e. The sub-floor of the building, in which the installation is made, is illustrated fragmentarily at 3, and it will be noted that the waste-pipe is inclined at an effective drainage gradient to the horizontal plane of the floor. The waste-pipe is connected at its lower end to the usual waste-stack 2, and at convenient points in its extent the inclined waste-pipe is supported above sub-floor level upon concrete piers 4.

In accordance with usual practice, the waste-pipe 1 is provided with a main vent-pipe 6, and the outlet branches with individual vent-pipes 7, all leading in this case to a common vent-stack 8.

The five outlet branches a to e terminate at their upper ends in inlet openings 5 that lie in common vertical plane, usually the vertical plane parallel to the plane of the wall of the room or building in which the battery of fixtures is to be installed. In this case the fixtures to be installed consist in four water closets and a urinal. The opening 5 of outlet branch d is arranged at proper interval h above sub-floor level (with the finish floor-line duly considered), to receive the outlet pipe or nipple of the urinal, while the openings 5 of the four outlet branches a, b, c, and e are arranged in horizontal alignment, at an interval m above sub-floor level, to receive the outlet connections of the four water closets. The outlet branch a consists in known and commonly used pipe fittings, connected directly to the waste-stack 2, but the other outlet branches b to e include the specialized fittings of this invention, and are connected to the waste-pipe 1. Due to the slope of the waste-pipe, each of the outlet branches b, c, and e must be of different length, since the inlet openings 5 of all three must be horizontally aligned with the inlet opening of branch a, while in the case of branch d both the slope of the waste-pipe 1 and the increased height of its inlet 5 above floor level means that its length must be greater than in any of the other outlet branches shown in the exemplary installation herein illustrated.

The structural refinements, which afford the advantages and realization of the objects mentioned in the introduction to this specification, are found in two pipe fittings 9 and 10. The fitting 9 is known as an H-Y fitting, while the fitting 10 may be termed a 90 degree elbow with a 45 degree twist. Each of the outlet branches b to e includes a pair 9, 10 of these fittings.

Referring particularly to Figs. II to IV inclusive, it will be perceived that each H-Y fitting 9 consists in a tubular body portion 9a and a tubular branch portion 9b. The opposite open ends of the body portion 9a are internally threaded, to receive the threaded terminals of pipe sections 1a and 1b of the waste-pipe 1. The branch portion 9b extends at an angle r (Fig. III) from body portion 9a and in common plane with the portion 9a; the portion 9a is axially aligned with the assembled pipe sections 1a, 1b; the threaded openings at the opposite ends of body portion 9a lie in planes normal to the longitudinal axis x—x of such body portion; and the branch portion 9b curves from the general direction of its extent, in such manner that the opening 9c (an internally threaded opening) at the distal end of the branch portion 9b is inclined to the common plane of the two body portions 9a and 9b. More specifically, the curvature or form of the branch portion 9b is such that the axis u—u of its terminal opening 9c extends (as viewed from above said common plane of the two body portions 9a and 9b) in parallelism with the axis x—x of the body portion 9a (cf. Fig. III), and (as viewed in a plane parallel with such axis x—x and normal to the plane first mentioned) extends obliquely (45 degrees in this case) to the axis x—x of said body portion 9a (cf. Fig. IV).

Turning now to Figs. II, V and VI, it will be perceived that the elbow 10 consists in a 90 degree elbow of compound curvature—an elbow whose open-ended, curved, tubular body is twisted laterally (downward as viewed in Fig. VI) from the general direction of its extent, or from the general plane of its curvature, through an angle of less than 90 degrees—45 degrees in this case. The two openings at the opposite ends of the elbow lie in planes that are normal to one another; both openings are internally threaded; one opening extends in vertical plane in the assembled installation and provides the opening 5 that receives the outlet connection of one of the toilet fixtures; and the other opening, the opening 5a, extends in a plane parallel to the opening 9c in the associated H-Y fitting 9 and inclined to the axis of the waste-pipe assembly 1. By virtue of the structure described, it becomes possible, in constructing the outlet branches b to d, to employ simple pipe connections between the H-Y fittings 9 and the elbows 10. Specifically, simple pipe nipples 12, each threaded at opposite ends, advantageously comprise the fittings which may be connected between the H-Y fittings and the elbows to form the outlet branches. And it will be understood that the graduated lengths or heights of the successive outlet branches may be determined readily and accurately by cutting the nipples 12 severally to proper lengths and threading them at their opposite ends.

In the completed installation, the inlet openings 5 of the outlet branches a to e all lie in a common vertical plane (Fig. II) that is spaced in interval n from, and extends parallel to, the axis x—x of the waste-pipe assembly 1. In gaining the simplified and improved organization described, several additional features of construction are of value. It will be noted that the compound curvature of the body of each elbow is such that the axis v—v of its opening 5a extends, as viewed in plan from above (Fig. V), at 90 degrees to the axis o—o of opening 5. It is further to be noted that these two transversely extending axes do not intersect; on the contrary, there is a substantial interval i between such axes, in the region of closest proximity of one axis to other. Note Fig. VI.

Each elbow 10 includes a tubular boss or hub 70 that in the assembled installation receives the lower end of a vent-pipe 7. In this case the end of pipe 7 is caulked or packed in the boss, providing an air-tight union of the vent-pipe with the outlet branch in which the elbow is assembled. In Fig. VI it will be perceived that the axis w—w of the tubular boss 70 extends parallel to the plane of opening 5 and angularly to the axis v—v of opening 5a. Additionally it is to be noted that the axis w—w of the tubular boss extends transversely to both axes o—o and v—v of the two openings in the elbow, and is spaced an interval q from one of such axes and an interval s from the other.

Returning to Fig. I, attention is particularly directed to the positions of the nipple-receiving openings 9c in the H-Y fittings 9. Each of such openings 9c is centered approximately at the same height above floor level as the body portion of the waste-pipe adjacent to which the opening lies. Thus it is possible to make interconnection of the elbows 10 with the openings 9c of the H-Y fittings when the vertical intervals between the openings 5 of the successive outlet branches and the waste-pipe are of less than usual value—a factor important to the ends in view. And in order to facilitate such interconnection of elbow to H-Y fitting at the remote end (right-hand end in Fig. I) of the waste-pipe, the structure of the elbow is modified in detail. Whereas the bodies of the elbows 10 are internally threaded to receive the nipples 12, the body of the modified elbow is externally threaded adjacent to the opening 5a', as shown in Fig. VII, and by virtue of such modification the elbow may be connected immediately to the H-Y fitting 9 at the end of the waste-pipe. That is, the externally threaded terminal of the elbow 10a is secured in the internally threaded opening 9c of the H-Y fitting, as shown at the right-hand end of the waste-pipe I in Fig. I.

In some cases two parallel batteries of toilet fixtures are connected to the same waste-pipe, and in such installations it is ordinarily requisite that an outlet branch and a vent-pipe be provided for each fixture. A simple elaboration in the H-Y fitting 9 readily adapts the structure to such requirements. Specifically, each H-Y fitting may be provided with a second branch portion, 9b', identical with the first-named branch portion and arranged on opposite side of the body portion 9a of the fitting, as shown in dotted lines in Fig. III. In such case a nipple and an elbow, or an elbow alone, may be connected in the mouth 9c of each branch portion, providing a pair of parallel outlet branches for two of the toilet fixtures, one in each of the two parallel batteries alluded to.

Alternately, it is contemplated that a single outlet branch may be provided for each pair of toilet fixtures, and that the elbow may be elaborated, to admit of the connection of the two fixtures to the single branch. Specifically, the elbow structure may be elaborated as shown in Figs. VIII and IX. In effect two elbows are embodied in a single structure, in which the two inlet openings 5", 5" for the outlets of the pair of fixtures are arranged in axial alignment, and communicate with a single opening 5a" that is either internally threaded to receive the nipple 12 of the outlet branch, or is externally threaded (as the elbow in Fig. VII) to be assembled immediately with an H-Y fitting in the waste-pipe 1. Two tubular bosses 70" and 70" are provided, one for the vent-pipe of each fixture, and it is important to note that in the integral structure the curved bodies of the two elbow portions merge at 100, in such manner that a medial partition 101 is provided within the structure, to prevent the discharge of one toilet fixture of the pair from flowing through to the outlet opening of the other.

Whereas, the threaded interconnection of the fittings is preferred, it remains to be said that my structure lends itself with advantage to soil-pipe installations, in which the parts are interconnected in caulked bell-and-spigot joints, as illustrated at 110 in Fig. XI. And in such case it becomes feasible, though not essential, to form integral with the elbow the nipple that interconnects the H-Y fitting with the elbow. Figs. X to XII show how a nipple 120 may be integrally constructed with the elbow of this invention, and it is merely necessary to cut away from the outer end of the nipple such portion as in the completed assembly will give the desired length or height of outlet branch.

Fig. XIII illustrates a case in which the vertical interval between the outlet of one or another of the fixtures and the waste-pipe is of such value that a standard Y fitting 130 may be used in the waste-pipe 1, with a nipple 131 used in conjunction with my specialized elbow to provide the branch connection between the outlet of the toilet fixture and the waste-pipe.

In Figs. XIV and XV, I illustrate the use of the double H-Y fitting, hereinabove mentioned, for connecting to the waste-pipe 1 two toilet fixtures arranged on opposite sides of the hollow utility wall (not shown) within which the drainage assembly is housed. The nipples 140 of each branch connection from the double H-Y fitting 90 may each carry at its upper end one of my specialized elbows, already described. Alternately a standard 45° elbow 141 may be secured to each nipple 140, and a horizontal nipple 142 may extend from the 45° elbow and carry a standard 90° vented elbow 143. The horizontal nipple of one branch connection may be of greater length than the other, so that accommodation may be made for horizontally staggering the toilet fixtures on opposite sides of the hollow utility wall. Fig. XVI illustrates a similar installation in which accommodation has been made for the vertical staggering of the toilet fixtures, or for the mounting of a low-outlet fixture on one side of the wall and a high-outlet fixture on the opposite side. And Fig. XVII illustrates another condition, in which the outlets of the fixtures on opposite sides of the wall are staggered both vertically and horizontally.

I claim as my invention:

1. In a plumbing installation including in known combination a main waste-pipe inclined to the horizontal, an inlet branch extending angularly from said waste-pipe for connecting the outlet of a toilet fixture to said waste-pipe, said inlet branch including a Y fitting and an elbow; the invention herein described in which said fitting consists in a tubular body portion connected in axial alignment with said waste-pipe, and a tubular branch portion extending angularly and laterally from and in common plane with said tubular body portion, said branch portion being curved from such plane and terminating at its distal end in an opening whose axis, as viewed from above said plane, extends parallel to the axis of said waste-pipe, and, as viewed in a plane parallel with said waste-pipe and normal to the plane first mentioned, extends obliquely to such axis of the waste-pipe; and in which said elbow consists in a tubular body extending with compound curvature between two openings, one of said elbow openings lying in a vertical plane parallel to and horizontally spaced from the vertical plane extending through the axis of said waste-pipe, and the other of said openings of the elbow lying in a plane normal to the plane of the elbow opening first mentioned and oblique to said axis of the waste-pipe, the axis of one of said elbow openings extending transversely to the axis of the other elbow opening, with a substantial interval between such last-mentioned axes in the region of closest proximity of one axis to the other.

2. In a plumbing installation including in known combination a main waste-pipe inclined to the horizontal, a plurality of inlet branches each including a Y fitting and an elbow, said branches being of different lengths and extending angularly from said waste-pipe for severally connecting toilet fixtures to said waste-pipe, and a vent-pipe for each inlet branch; the invention herein described in which the fitting in each of said inlet branches consists in a tubular body portion connected in axial alignment with said waste-pipe, and a tubular branch portion extending angularly and laterally from and in common plane with said tubular body portion, said branch portion being curved at its distal end from such plane and terminating in an opening for connection to said elbow, the axis of said opening, as viewed from above said plane, extending parallel to the axis of said waste-pipe, and, as viewed in a plane parallel with said waste-pipe and normal to the plane first mentioned, extending obliquely to such axis of the waste-pipe; and said elbow in each of said inlet branches consisting in a tubular body extending with compound curvature between two openings, one of said elbow openings being connected to said opening of the branch portion of said fitting and lying in a plane normal to the plane of the other opening of said elbow, and the axes of said openings in the elbow extending transversely to each other, with a substantial interval between such two axes in the region of closest proximity of one axis to the other, and a tubular hub extending angularly from said elbow, to receive the lower end of a vent-pipe.

MARTIN A. SISK.